United States Patent
Tsuchiya et al.

(10) Patent No.: US 10,536,061 B2
(45) Date of Patent: Jan. 14, 2020

(54) METHOD FOR MANUFACTURING STATOR OF ROTARY ELECTRIC MACHINE

(71) Applicant: TOYOTA JIDOSHA KABUSHIKI KAISHA, Toyota-shi, Aichi-ken (JP)

(72) Inventors: Yukio Tsuchiya, Toyota (JP); Hiroyuki Hattori, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 123 days.

(21) Appl. No.: 15/193,714

(22) Filed: Jun. 27, 2016

(65) Prior Publication Data

US 2017/0005552 A1   Jan. 5, 2017

(30) Foreign Application Priority Data

Jun. 30, 2015 (JP) ................ 2015-131060

(51) Int. Cl.
| | |
|---|---|
| *H02K 15/00* | (2006.01) |
| *H02K 15/04* | (2006.01) |
| *H02K 15/16* | (2006.01) |
| *H02K 15/12* | (2006.01) |

(52) U.S. Cl.
CPC ................. *H02K 15/12* (2013.01)

(58) Field of Classification Search
CPC .. H02K 3/46; H02K 3/30; H02K 3/52; H02K 15/028; H02K 15/067; H02K 15/085; H02K 15/12

See application file for complete search history.

(56) References Cited

U.S. PATENT DOCUMENTS

| | | | |
|---|---|---|---|
| 6,700,283 B2 * | 3/2004 | Kikuchi | H02K 1/185 310/214 |
| 6,737,782 B2 * | 5/2004 | Suzuki | H02K 1/148 310/194 |
| 7,973,446 B2 * | 7/2011 | Calley | H02K 1/02 310/216.061 |
| 9,634,533 B2 * | 4/2017 | Uchitani | H02K 3/345 |

FOREIGN PATENT DOCUMENTS

| | | |
|---|---|---|
| JP | 2005012861 A | 1/2005 |
| JP | 2014-007836 A | 1/2014 |
| JP | 2016-046880 A | 4/2016 |
| JP | 2016-082624 A | 5/2016 |
| WO | 2016/027147 A2 | 2/2016 |

* cited by examiner

*Primary Examiner* — Paul D Kim
(74) *Attorney, Agent, or Firm* — Sughrue Mion, PLLC

(57) ABSTRACT

A method for manufacturing a stator of a rotary electric machine includes: assembling an insulator and a stator coil to a tooth; and after assembling, pouring a liquid adhesive into an opening of the insulator from an outer side of the stator coil so as to fix the stator coil to a stator core.

6 Claims, 9 Drawing Sheets

METHOD FOR MANUFACTURING STATOR OF ROTARY ELECTRIC MACHINE

INCORPORATION BY REFERENCE

The disclosure of Japanese Patent Application No. 2015-131060 filed on Jun. 30, 2015 including the specification, drawings and abstract is incorporated herein by reference in its entirety.

BACKGROUND OF THE INVENTION

1. Field of the Invention

The present disclosure relates to a method for manufacturing a stator of a rotary electric machine, the rotary electric machine including: a stator core; a stator coil wound around teeth of the stator core; and an insulator interposed between the stator core and the stator coil.

2. Description of Related Art

As it has widely been known, a stator of a rotary electric machine includes a stator core and a stator coil, and the stator coil is wound around teeth of the stator core. In general, an insulator that is made of an insulating material is disposed between the stator coil and the stator core so as to electrically insulate both of these.

By the way, in order to improve reliability of the rotary electric machine with respect to a disturbance, it is desired to fix the stator coil to the stator core in such a rotary electric machine, so as to prevent movement of the stator coil with respect to the stator core. Here, the insulator is interposed between the stator coil and the stator core. Accordingly, when the stator coil and the stator core are fixed, conventionally, the stator coil and the insulator are fixed by using an adhesive, and the insulator and the stator core are further fixed by using the adhesive. However, the adhesive has to be applied twice in this case, and a manufacturing process is complicated.

In Japanese Patent Application Publication No. 2014-7836 (JP 2014-7836 A), a technique for simplifying adhesion of the insulator and the stator coil is disclosed. In JP 2014-7836 A, the insulator has a varnish guide hole and a varnish guide groove. The varnish guide groove is formed on a surface of the insulator which contacts to the stator coil. The varnish guide hole is provided in an upper surface of a flange section of the insulator, and the varnish guide hole connects to the varnish guide groove. The stator coil is wound around the insulator, and the varnish is poured into the varnish guide groove from the varnish guide hole, so as to fix the insulator and the stator coil. According to such a technique, the insulator and the stator coil can easily be fixed. However, fixation of the insulator and the stator core is not considered in JP 2014-7836 A. In order to fix both of these, another dedicated process is required.

SUMMARY OF THE INVENTION

In view of the above, the present disclosure provides a method for manufacturing a stator, in which a stator coil can easily be fixed to a stator core.

A method for manufacturing a stator of the present disclosure is a method for manufacturing a stator of a rotary electric machine, the rotary electric machine including: a stator core; a stator coil wound around tooth of the stator core; and an insulator interposed between the stator coil and the stator core, and the insulator having an opening in a portion thereof held between the stator core and the stator coil. The method for manufacturing the stator includes: assembling the insulator and the stator coil to the tooth; and pouring, after assembling, a liquid adhesive into the opening from an outer side of the stator coil so as to fix the stator coil to the stator core.

According to the present disclosure, the opening is provided in the insulator, and the liquid adhesive is poured into said opening, so as to directly fix the stator coil to the stator core. As a result, the number of application processes of the liquid adhesive can be reduced, and the stator coil can easily be fixed to the stator core when compared to the related art.

The insulator may have: a coil wound section which is attached to the tooth and around an outer periphery of which the stator coil is wound; and a flange section that extends from an end on a radially outer side of the coil wound section to an outer side in an axial direction and in a circumferential direction. The insulator has the opening in an axial end surface of the coil wound section. In this case, the liquid adhesive may be dropped from an upper side of a coil end section in a state where the stator is held in such a posture that the axial direction is parallel to a vertical direction.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
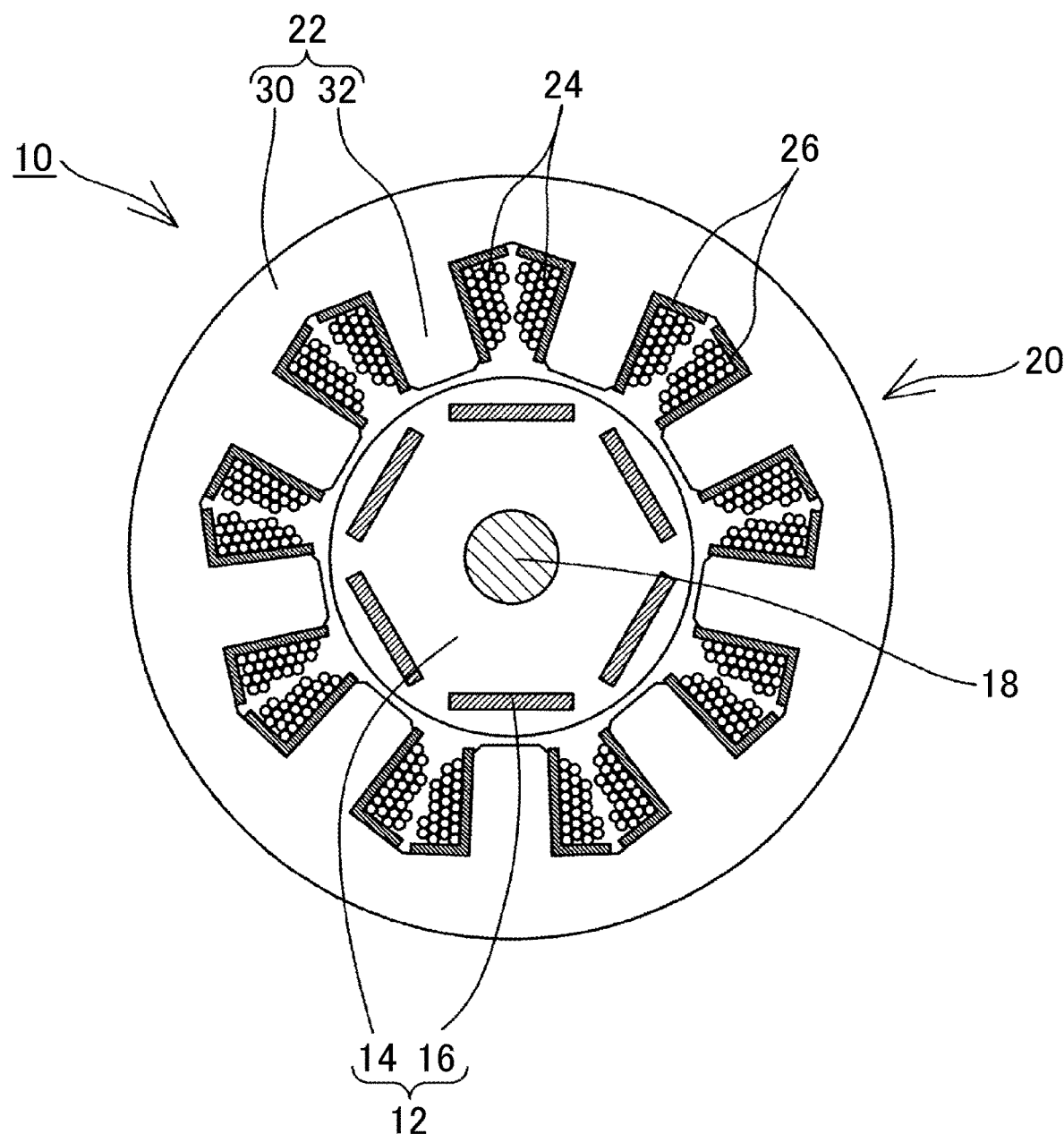
FIG. 1 is a lateral cross-sectional view of a rotary electric machine as an embodiment of the present disclosure.
Figure 2:
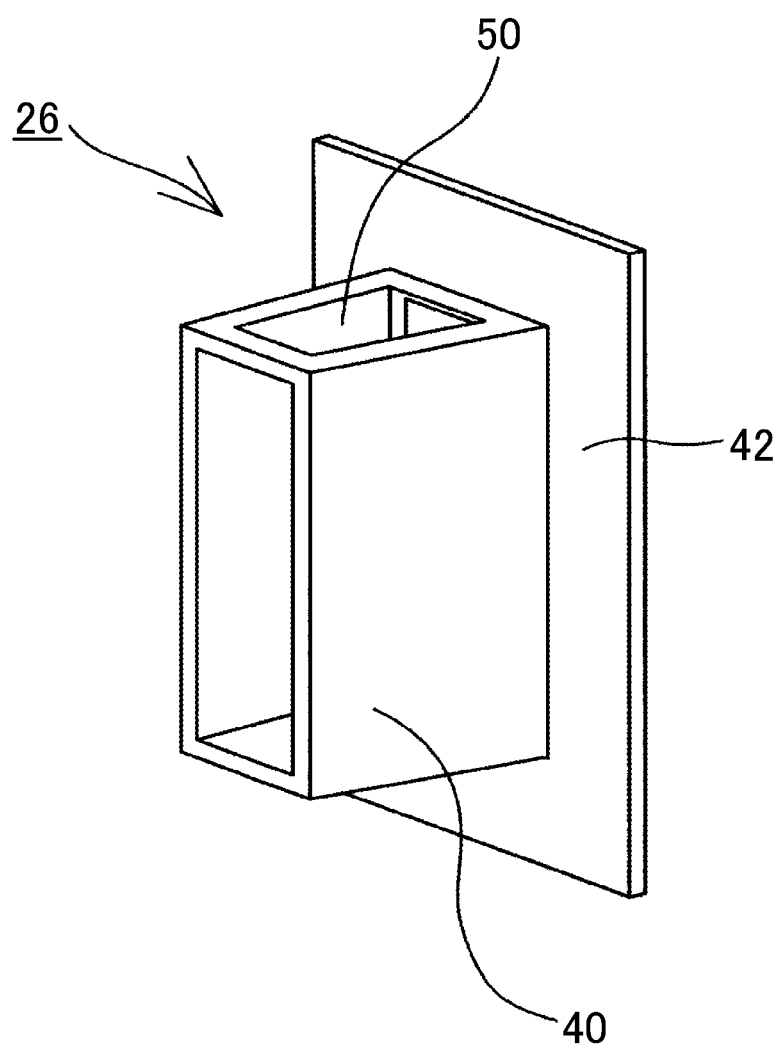
FIG. 2 is a perspective view of an insulator.

A description will hereinafter be made on an embodiment of the present disclosure with reference to the drawings. FIG. 1 is a lateral cross-sectional view of a rotary electric machine 10 as the embodiment of the present disclosure. In addition, FIG. 2 is a perspective view of an insulator 26 that is attached to a tooth 32. An "axial direction", a "radial direction", and a "circumferential direction" in the following description respectively mean an axial direction, a radial direction, and a circumferential direction of a stator 20.

The rotary electric machine 10 of this embodiment includes a rotor 12 and the stator 20. The rotor 12 includes a rotor core 14 and plural permanent magnets 16 that are embedded in said rotor core 14. A rotary shaft 18 is inserted through a center of the rotor core 14, and said rotary shaft 18 is rotatably supported by a case (not shown) via a bearing (not shown) and the like. The rotor 12 is rotatable with this rotary shaft 18.

The stator 20 is disposed on a radially outer side of the rotor 12 in a concentric manner with the rotor 12. The stator 20 includes: a substantially annular stator core 22 that is formed with the plural teeth 32 on an inner circumference thereof; a stator coil 24 that is wound around each of the teeth 32; and the insulator 26 that is interposed between the stator core 22 and the stator coil 24. The stator core 22 is largely divided into an annular yoke 30 and the teeth 32 that are projected to a radially inner side of said yoke 30. This stator core 22 is constructed of plural electromagnetic steel sheets (for example, silicon steel sheets) that are stacked in the axial direction. Note that, although the nine teeth 32 are provided in an illustrated example, this number of units may appropriately be changed.

The stator coil 24 is configured by concentrated winding of wire with a circular cross section. A surface of the wire is enameled to secure insulation from the adjacent wire. The stator coil 24 has three-phase coils, that is, a U-phase coil, a V-phase coil, and a W-phase coil. Each of the phase coils is configured by connecting plural single coils in series, and each of the single coils is configured by winding the wire around one of the teeth 32. On the plural teeth 32, the single U-phase coil, the single V-phase coil, and the single W-phase coil are set to be sequentially and repeatedly aligned in the circumferential direction. Note that such a configuration of the stator coil 24 is merely an example and it may appropriately be changed. For example, the stator coil 24 is not limited to the concentrated winding but may be configured by distributed winding. In addition, the wire may be rectangular wire with a rectangular cross section instead of the circular cross section.

Figure 3:
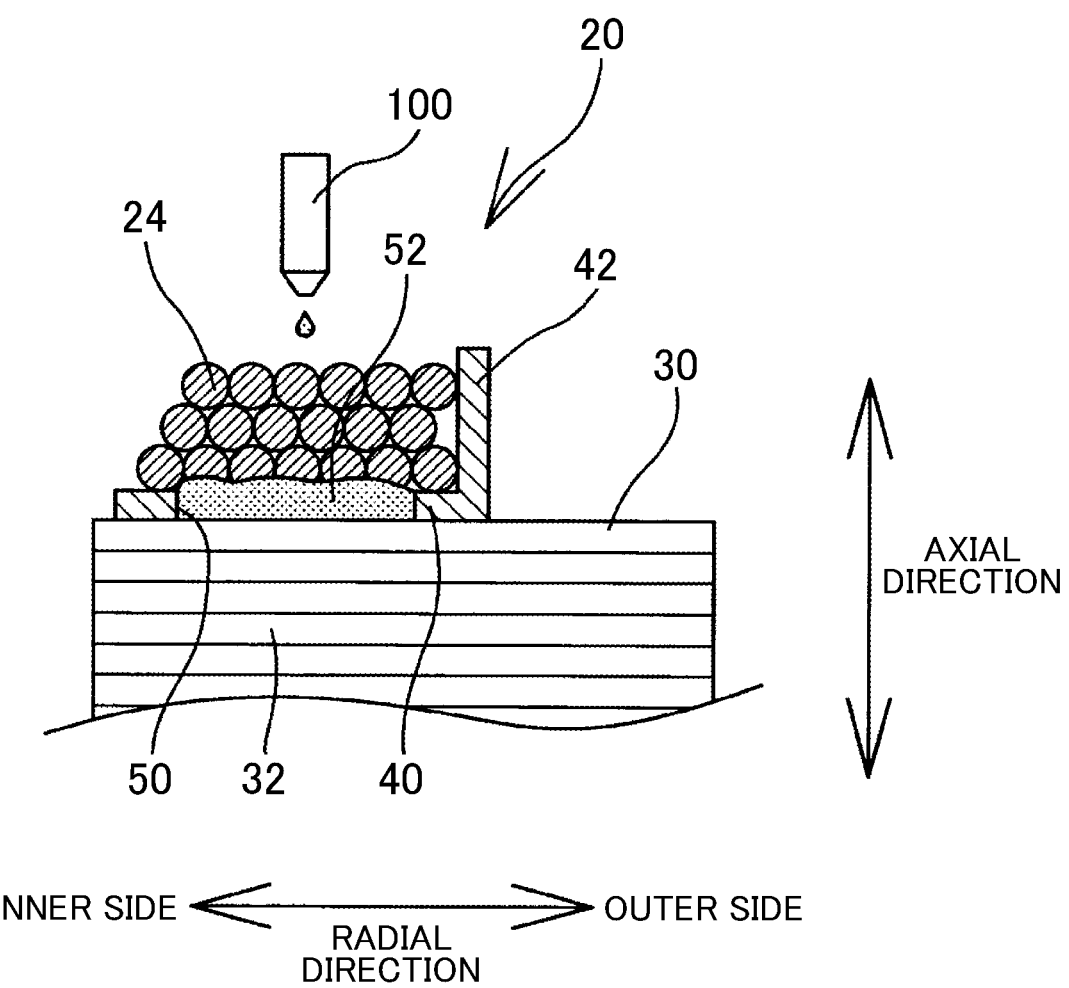
FIG. 3 is an image that shows a manufacturing process of a stator.

The insulator 26 is disposed between the stator core 22 and the stator coil 24. The insulator 26 is a member that is formed of an insulating material, for example, a resin material such as a polyethylene terephthalate resin (a PET resin). As shown in FIG. 3, the insulator 26 is largely divided into: a coil wound section 40 in a substantially quadrangular cylindrical shape; and a flange section 42 that extends to an axially outer side and in the circumferential direction from an end on the radially outer side of said coil wound section 40. The coil wound section 40 has a shape that corresponds to the tooth 32 and has the quadrangular cylindrical shape, in which two surfaces that oppose each other in the radial direction are opened. The coil wound section 40 is inserted between the teeth 32 from the radially inner side and covers a periphery of the tooth 32. In addition, the stator coil 24 is wound around an outer periphery of the coil wound section 40. Furthermore, as shown in FIG. 2, in this embodiment, an opening 50 is provided in an axial end surface of the coil wound section 40, that is, a surface of the insulator 26 that is held between a coil end section of the stator coil 24 and an axial end surface of the tooth 32. This opening 50 is a through hole that communicates an inner side and an outer side of the cylindrical coil wound section 40, and is a part into which a liquid adhesive, which will be described below, is poured.

The flange section 42 extends from the end on the radially outer side of the coil wound section 40 to an outer side in the axial direction and the circumferential direction. When the insulator 26 is assembled to the tooth 32, the flange section 42 is positioned along an inner circumferential surface of the yoke 30 and is interposed between the yoke 30 and the stator coil 24.

Figure 4:
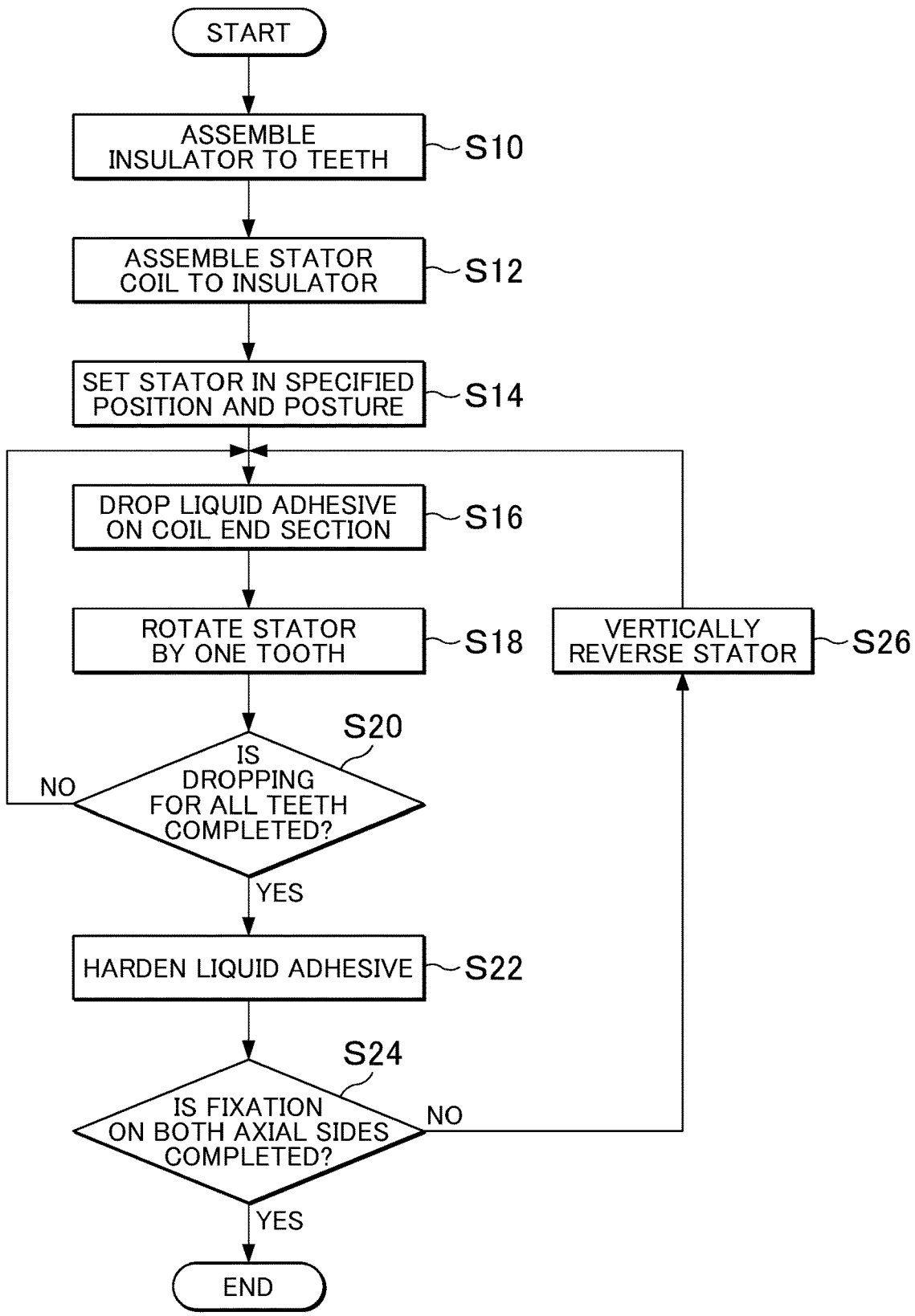
FIG. 4 is a flowchart that shows a flow of manufacturing of the stator.

Next, a description will be made on a flow of manufacturing of such a stator 20 with reference to FIG. 3 and FIG. 4. FIG. 3 is an image of a manufacturing process of the stator 20, and is a schematic vertical cross-sectional view of the stator 20. Meanwhile, FIG. 4 is a flowchart that shows the flow of the manufacturing of the stator 20.

When the stator 20 is manufactured, the insulator 26 is assembled to each of the teeth 32 of the stator core 22 (S10).

Next, the single coil that is wound in advance is fitted to an outer periphery of the insulator 26 that is attached to the tooth 32 (thus to an outer periphery of the tooth 32), and is assembled (S12).

The insulator 26 and the stator coil 24 have been assembled to the stator core 22. Next, the stator coil 24 is fixed to the stator core 22 (S14 to S22). This is done to improve reliability of the stator 20 with respect to a disturbance. More specifically, in the case where the stator 20 is subjected to external stress, such as vibrations and a temperature change, in a state where the stator coil 24 and the stator core 22 are not fixed, the stator coil 24 can move with respect to the stator core 22. As a result, noise is generated, and/or the stator coil 24 is rubbed, which further leads to possible degradation of an insulating film or possible degradation of the wire itself. In order to restrict such movement of the stator coil 24, the stator coil 24 is conventionally fixed to the stator core 22.

Various methods for fixing such a stator coil 24 can be considered. In this embodiment, the stator coil 24 is fixed to the stator core 22 by using a liquid adhesive 52. A type and the like of the liquid adhesive 52 to be used are not limited as long as it can firmly adhere the stator coil 24 and the stator core 22. For example, an epoxy-based adhesive or the like can be used. In addition, in this embodiment, the liquid adhesive 52 needs to pass through a gap between the wire. Thus, the liquid adhesive 52 desirably has relatively low viscosity (for example, 2 Pa·S or lower) in a state before being hardened.

In a case of fixing the stator coil 24, first, the stator 20 is held in such a posture that the axial direction thereof is substantially parallel to a vertical direction (S14). In addition, a position of the stator 20 is adjusted such that one of the teeth 32 is positioned immediately below a discharge nozzle 100 of the liquid adhesive 52. Once the stator 20 is set in the specified posture and position, the liquid adhesive 52 is dropped on the coil end section of the stator coil 24 that is assembled to one of the teeth 32 (S16). The liquid adhesive 52 that has been dropped on the coil end section passes through the gap between the wire due to gravity or a capillary phenomenon, advances downward, and flows into the opening 50 of the insulator 26. The liquid adhesive 52 that has flowed into the opening 50 can come in contact with all of the axial end surface of the tooth 32, the coil end section of the stator coil 24, and the insulator 26.

After the liquid adhesive 52 is dropped on one of the teeth 32, the stator 20 is rotated by one tooth, and the different tooth 32 is positioned immediately below the discharge nozzle 100 (S18). Then, the liquid adhesive 52 is dropped again (S16). If the liquid adhesive 52 can be dropped on all of the teeth 32 (Yes in step S20), then the liquid adhesive 52 is hardened (S22). The liquid adhesive 52 has flowed into the opening 50 and is in contact with both of the stator coil 24 and the stator core 22. The stator coil 24 can be fixed to the stator core 22 by hardening the liquid adhesive 52.

After the liquid adhesive 52 is hardened, the coil end section on an opposite side in the axial direction is fixed. That is, once fixation of the coil end section on an axial end side of the stator 20 is completed, the stator 20 is vertically reversed (S26). Then, the processing in steps S16 to S22 is performed on the other axial end side of the stator 20. If the coil end sections on both axial sides can be fixed (Yes in step S24), the manufacturing processing of the stator 20 is terminated.

Figure 9:
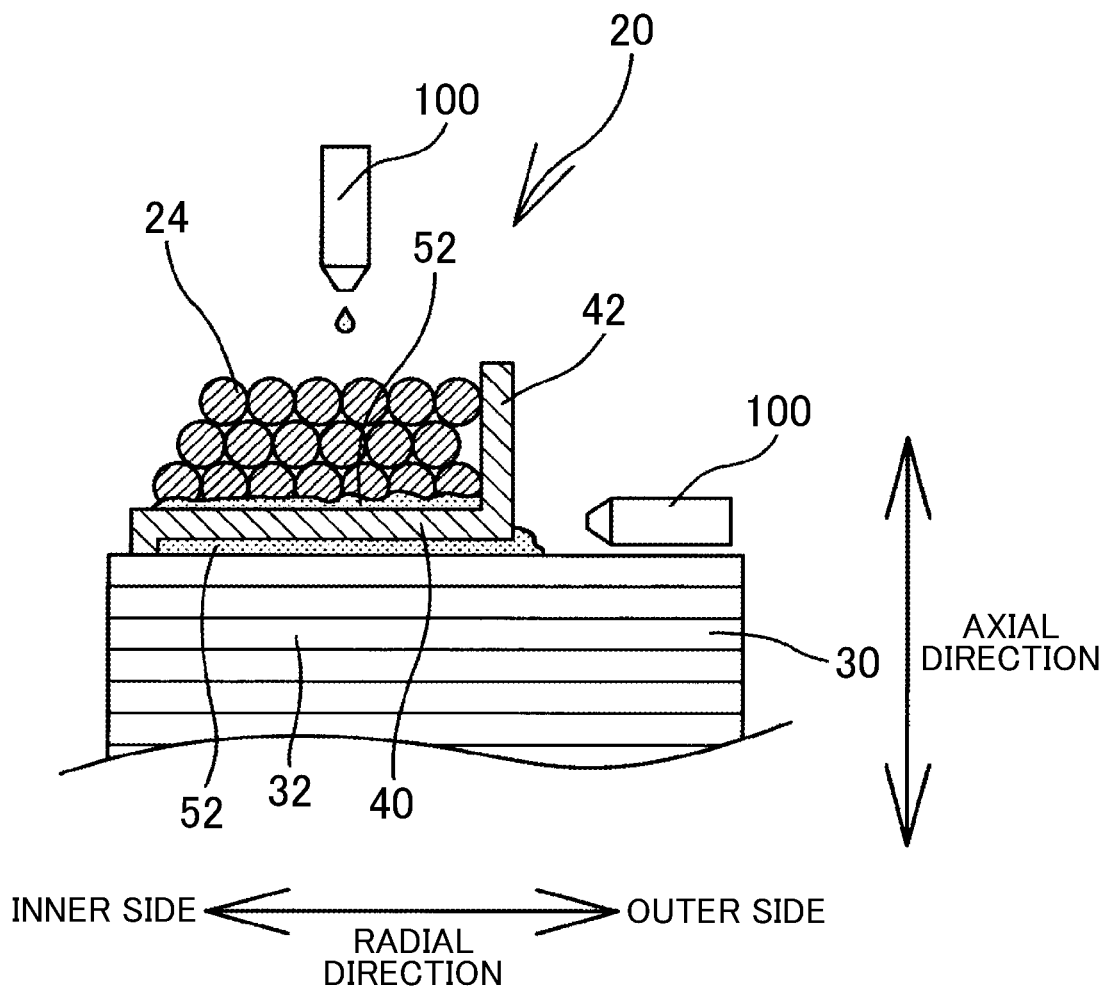
FIG. 9 is an image that shows a manufacturing process of a conventional stator.

Here, as it is apparent from the description so far, according to this embodiment, the stator coil 24 can be fixed to the stator core 22 by dropping the liquid adhesive 52 from an outer side of the stator coil 24. As a result, the stator 20 can be manufactured further easily when compared to the related art. A description will be made thereon with reference to FIG. 9. FIG. 9 is an image that shows a manufacturing process of the conventional stator 20. Here, the outer side of the stator coil 24 is an outer side of the stator coil 24 and is a side other than a side of the stator coil 24 that opposes the insulator 26 (an inner side). That is, the outer side of the stator coil 24 is a side on which the stator coil 24 is exposed at a time that is before the liquid adhesive 52 is dropped and that is after the insulator 26 and the stator coil 24 are assembled to the stator core 22.

The opening 50 is not provided in the conventional insulator 26. Accordingly, when the stator coil 24 is fixed to the stator core 22, a process of applying the liquid adhesive 52 between the insulator 26 and the stator coil 24 and a process of applying the liquid adhesive 52 between the insulator 26 and the stator core 22 are required. Just as described, in the related art, the liquid adhesive 52 has to be applied twice for each of the teeth 32, and thus the manufacturing process is complicated.

In addition, a space for applying the liquid adhesive 52 has to be secured between the stator core 22 and the insulator 26. Accordingly, the coil end section is increased in height by this space, which leads to enlargement of the rotary electric machine 10. Furthermore, a distance between the coil end section (the stator coil 24) and the stator core 22 is increased. Thus, there is a problem of degraded thermal conductivity therebetween.

On the other hand, in this embodiment, as described above, the stator coil 24 can be fixed to the stator core 22 only by dropping the liquid adhesive 52 from the outer side of the stator coil 24. As a result, the number of application processes of the liquid adhesive 52 can be reduced by half when compared to the related art. In addition, according to this embodiment, there is no need to provide an application space for the liquid adhesive 52 between the stator core 22 and the insulator 26. Thus, the height of the coil end section can be suppressed to be low, and physical constitution of the rotary electric machine 10 can be made small. Furthermore, because the distance between the stator coil 24 and the stator core 22 can be reduced, the thermal conductivity therebetween can be improved. As a result, such a problem that excess heat is retained in only one of the stator coil 24 and the stator core 22 can be prevented.

Note that each of the configuration and the manufacturing process described so far is merely one example and another configuration and another process can appropriately be changed as long as the liquid adhesive 52 is poured into the opening 50 of the insulator 26 of the stator coil 24 from the outer side so as to fix the stator coil 24 to the stator core 22.

For example, in this embodiment, fixation processing of the stator coil 24 (dropping•hardening processing of the liquid adhesive 52) is performed on both of the axial sides of the stator 20. However, such fixation processing may only be performed on one of the sides in the axial direction. That is, steps S24, S26 may be omitted in the flowchart in FIG. 4. In addition, in this embodiment, the stator coil 24 is assembled to the insulator 26 after the insulator 26 is assembled to the tooth 32. However, this procedure may be reversed. That is, in FIG. 4, step S10 may be executed after step S12 is executed.

Figure 5:
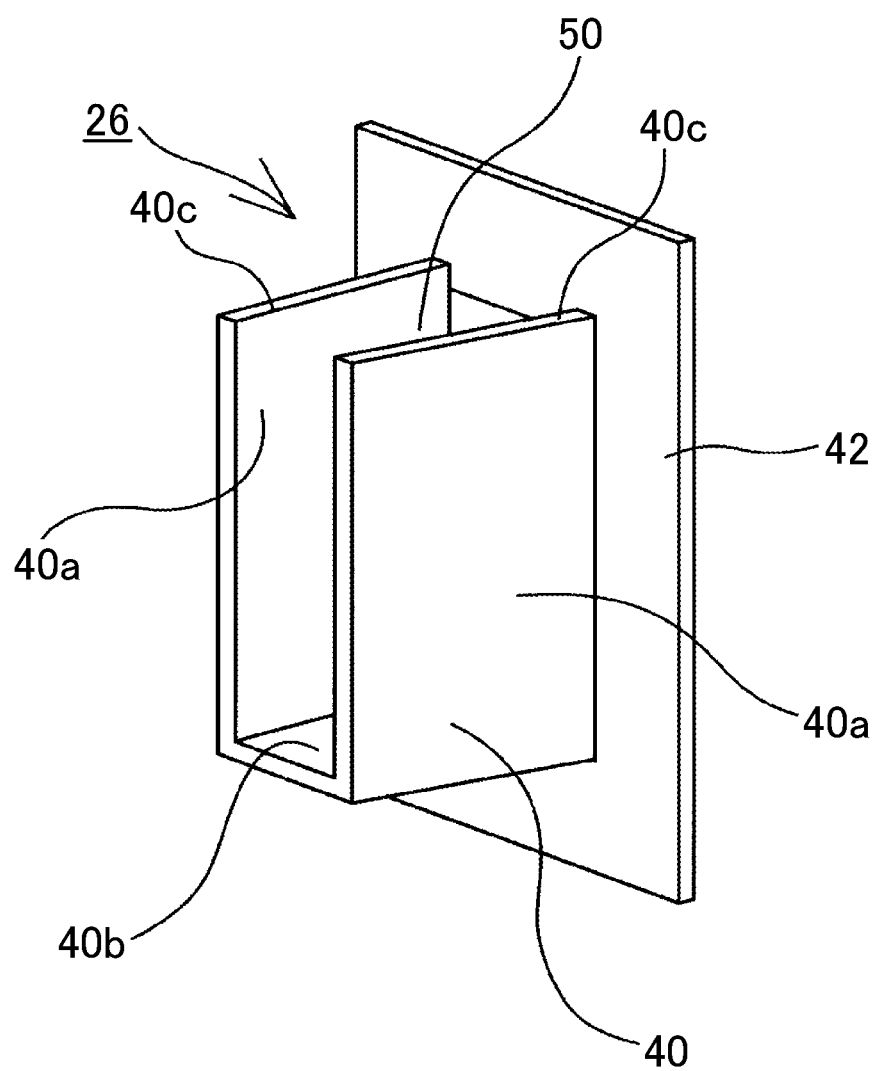
FIG. 5 is a perspective view of another insulator.

In addition, in the example of FIG. 2, the opening 50 of the insulator 26 is the through hole formed in the axial end surface. However, a shape, size, and a position of the opening 50 may appropriately be changed as long as the opening 50 is formed at a position in the insulator 26 at which the opening 50 is held between the stator coil 24 and the stator core 22. For example, as shown in FIG. 5, substantially the entire axial end surface of the coil wound section 40 may serve as the opening 50. That is, the coil wound section 40 is roughly formed in a U shape that includes both side walls 40*a* and a bottom wall 40*b*. At this time, axial length of each of the side walls 40*a* is set longer than axial length of the tooth 32. When such an insulator 26 is inserted in the teeth 32, axial end surfaces of the side walls 40*a* function as beams 40*c*, across which the stator coil 24 is disposed. When the stator coil 24 is disposed across these two beams 40*c*, an appropriate space is formed between the stator coil 24 and the tooth 32, and thus the insulation therebetween is retained.

Figure 6:
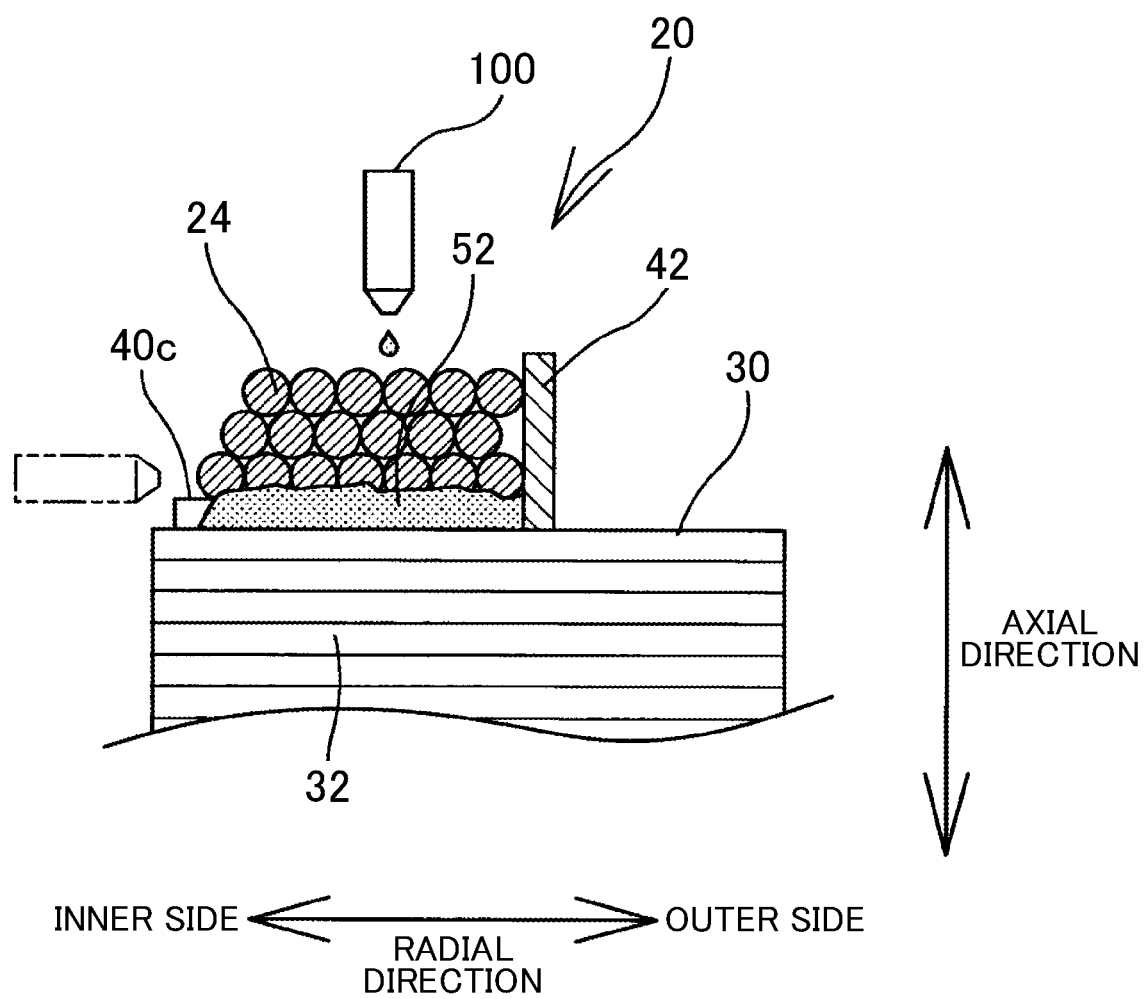
FIG. 6 is an image that shows a manufacturing process of another stator.

Even in the case where the insulator 26 with such a configuration is used, as shown in FIG. 6, the liquid adhesive 52 only needs to be dropped from the outer side of the stator coil 24 toward the coil end section. The dropped liquid adhesive 52 enters the gap in the stator coil 24 and flows into the opening 50 due to the gravity or the capillary phenomenon. Then, the liquid adhesive 52 is hardened in this state, and the stator coil 24 is thereby fixed to the stator core 22.

In addition, in the description so far, the liquid adhesive 52 is dropped on the coil end section primarily by using the gravity. However, the liquid adhesive 52 may be supplied from another direction or to another portion as long as the liquid adhesive 52 can flow into the opening 50 in the end. For example, as indicated by a two-dot chain line in FIG. 6, the liquid adhesive 52 may be supplied from the radially inner side toward the coil end section. In this case, in order to make the liquid adhesive 52 reach the opening 50, such a measure that injection pressure of the liquid adhesive 52 is increased or the like may be adopted.

Figure 7:
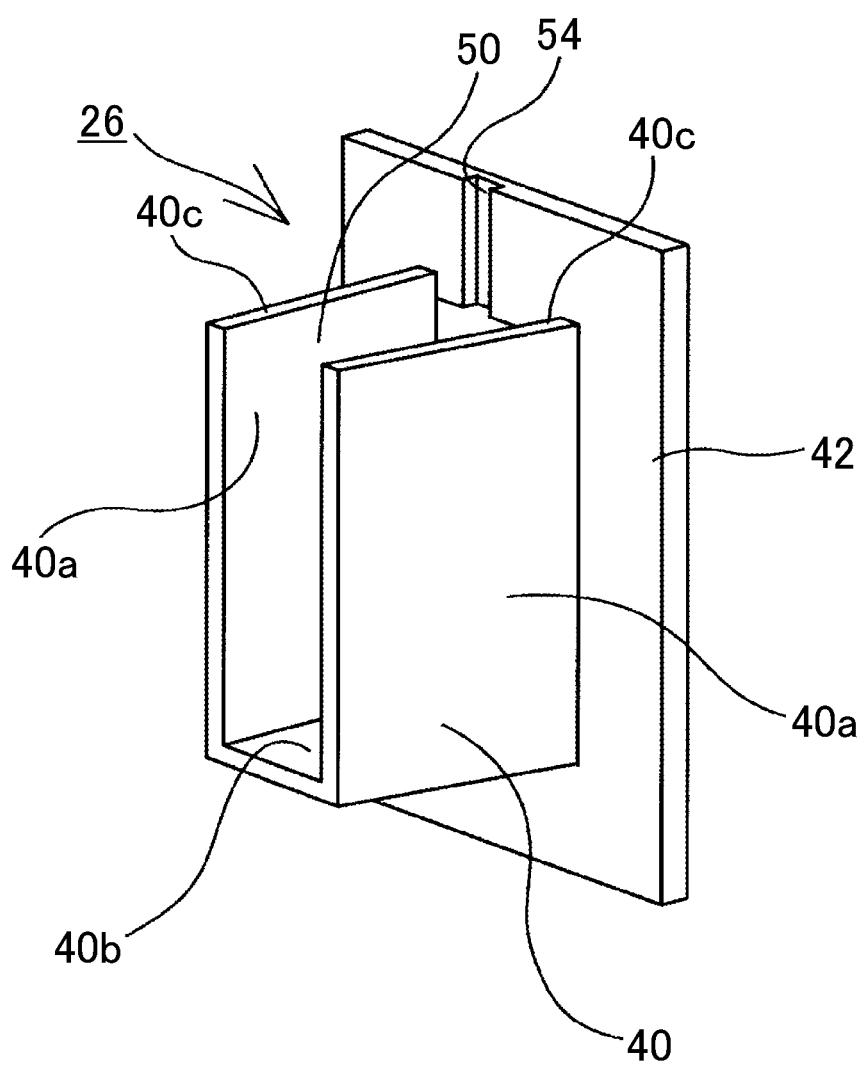
FIG. 7 is a perspective view of yet another insulator.

In addition, as shown in FIG. 7, a groove 54 that leads to the opening 50 may be provided in the flange section 42, and the liquid adhesive 52 may be poured into the opening 50 via said groove. In an example shown in FIG. 7, the groove 54 extends from the axial end surface of the flange section 42 to a height position of the opening 50. When the liquid adhesive 52 flows into such a groove 54, the liquid adhesive 52 can easily flow into the opening 50. As a result, a time required to pour the liquid adhesive 52 can be shortened, and thus a manufacturing time of the stator 20 can further be shortened.

Figure 8:
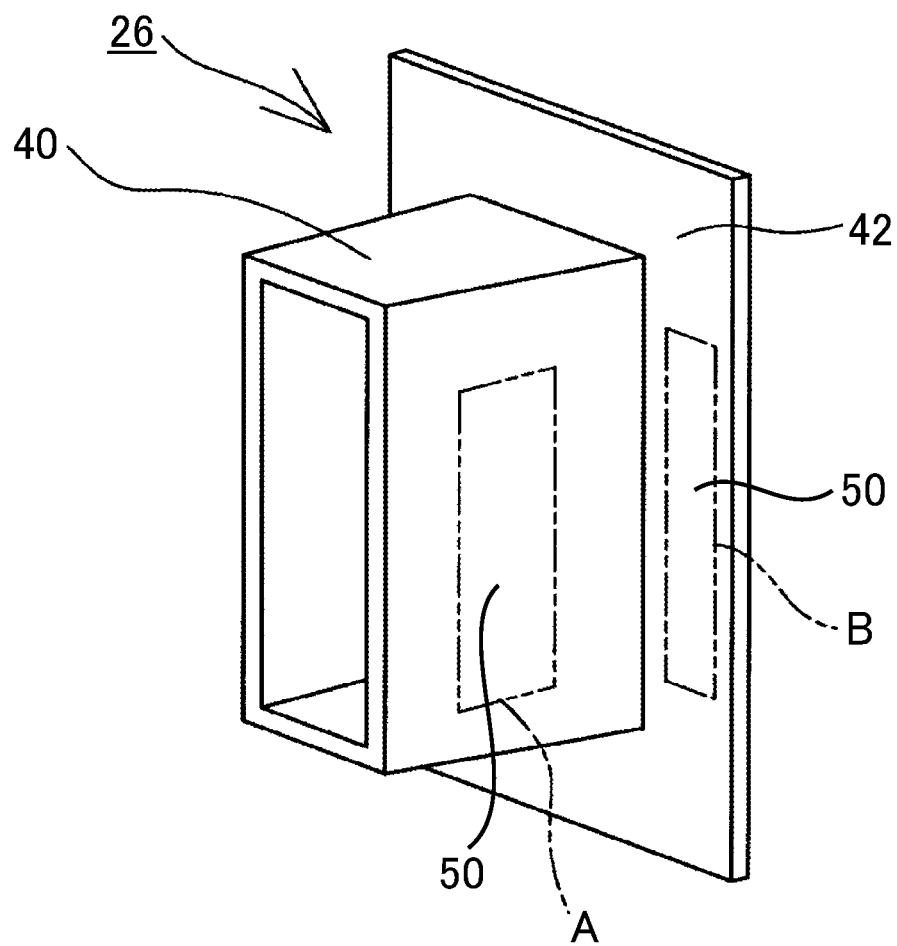
FIG. 8 is a perspective view of further another insulator.

Furthermore, in the description so far, the opening 50 is provided in the axial end surface of the coil wound section 40. In the case where the opening 50 is provided in the axial end surface of the coil wound section 40, the liquid adhesive 52 only needs be supplied to the coil end section as a portion of the stator coil 24 that is exposed to the outer side, and thus a large installation space of the discharge nozzle 100 of the adhesive and the like can be secured. In addition, in the case where the axial direction of the stator 20 is set to be parallel to the vertical direction during the supply of the liquid adhesive 52, the liquid adhesive 52 can be poured into the opening 50 by using the gravity. Thus, the manufacturing process can be simplified. However, the opening 50 may be provided in another portion of the insulator 26 as long as it is a portion that is held between the stator coil 24 and the stator core 22. For example, the opening 50 may be provided in a side wall of the coil wound section 40 like a position A in FIG. 8. Alternatively, the opening 50 may be provided in a portion of the flange section 42 that is held between the stator coil 24 and the yoke 30, for example, at a position B in FIG. 8 or the like. Also in the case where the opening 50 is provided in the side wall of the coil wound section 40 or the flange section 42, the liquid adhesive 52 only needs to be supplied from the outer side of the stator coil 24. The supplied liquid adhesive 52 enters the gap between the wire and flows into the opening 50 due to discharge pressure from the nozzle or the capillary phenomenon. Furthermore, the wire with the circular cross section is exemplified in the description so far. However, the rectangular wire with the rectangular cross section may be used. In the case where the rectangular wire is used as the wire, the gap between the wire is reduced. However, also in this case, the liquid adhesive 52 penetrates through the gap between the wire due to the capillary phenomenon and flows into the opening 50 in the end. In the case where such a configuration that the liquid adhesive 52 is poured into the opening 50 through the gap between the wire is adopted, a configuration like the groove 54 in FIG. 7 does not have to be provided separately. Thus, a configuration of the insulator 26 and the like can be simplified.

A summary of the embodiment will hereinafter be described. This stator 20 includes: the stator core 22; the stator coil 24 wound around the tooth 32 of the stator core 22; and the insulator 26 interposed between the stator coil 24 and the stator core 22. The insulator 26 includes the opening 50 in the portion thereof held between the stator core 22 and the stator coil 24. After the insulator 26 and the stator coil 24 are assembled to the tooth 32, the liquid adhesive 52 is poured into the opening 50 from the outer side of the stator coil 24 in the axial direction of the rotary electric machine 10, and the stator coil 24 is fixed to the stator core 22.

What is claimed is:

1. A method for manufacturing a stator of a rotary electric machine, the rotary electric machine including: a stator core; a stator coil wound around a tooth of the stator core; and an insulator interposed between the stator coil and the stator core, the insulator having an opening in a portion sandwiched between the stator core and the stator coil,
the method for manufacturing comprising:
assembling the insulator and the stator coil to the tooth; and
applying, after assembling, a liquid adhesive on a surface of the stator coil in a radial direction of the stator coil such that the liquid adhesive, after being applied, pours through a gap between wires of the stator coil into the opening from an outer side of the stator coil so as to fix the stator coil to the stator core, wherein
the surface of the stator coil in which the liquid adhesive is applied in a radial direction of the stator coil is an outer surface of the stator coil.

2. The method for manufacturing the stator according to claim 1, wherein
the insulator includes:
a coil wound section which is attached to the tooth and around an outer periphery of which the stator coil is wound; and
a flange section extending from an end of the coil wound section, that is towards radially outer side of the stator to an outer side of the coil wound section in an axial direction of the stator and in a circumferential direction of the coil wound section;
wherein the insulator has the opening in an axial end surface of the coil wound section that faces towards the axial direction of the stator.

3. The method for manufacturing the stator according to claim 2,
wherein the liquid adhesive is dropped from an upper side of a coil end section of the stator coil to an end surface of the coil end section, that is opposite of the upper side of the coil end section in the axial direction of the stator, in a state where the stator is held in such a posture that the axial direction of the stator is parallel to a direction of gravity.

4. The method for manufacturing the stator according to claim 1, wherein
the opening of the insulator is located entirely within a wall of the insulator that is sandwiched between the tooth and the stator coil when the insulator and the stator coil are assembled to the tooth.

5. The method for manufacturing the stator according to claim 1, wherein
the opening of the insulator extends between two side walls of the insulator along an entire length of the side walls, the side walls covering respective sides of the tooth, that are opposite to each other, when the insulator and the stator coil are assembled to the tooth.

6. The method for manufacturing the stator according to claim 1, wherein
the opening of the insulator extends between two side walls of the insulator, the side walls covering respective sides of the tooth, that are opposite to each other, when the insulator and the stator coil are assembled to the tooth, and
in the applying the liquid adhesive on the surface of the stator coil, the liquid adhesive is discharged from an end of a nozzle to the surface of the stator coil while the end of the nozzle is positioned completely above and between the two side walls of the insulator.

* * * * *